US010031246B2

(12) United States Patent
Zhou et al.

(10) Patent No.: US 10,031,246 B2
(45) Date of Patent: Jul. 24, 2018

(54) RF-PHOTONIC SYSTEM FOR ACOUSTIC AND/OR VIBRATIONAL SENSING USING OPTICAL FIBER AND METHOD THEREOF

(71) Applicant: U.S. Army Research Laboratory ATTN: RDRL-LOC-I, Adelphi, MD (US)

(72) Inventors: Weimin Zhou, Rockville, MD (US); Olukayode Okusaga, College Park, MD (US); James P Cahill, College Park, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1015 days.

(21) Appl. No.: 13/920,570

(22) Filed: Jun. 18, 2013

(65) Prior Publication Data

US 2014/0130601 A1    May 15, 2014

Related U.S. Application Data (63) Continuation-in-part of application No. 13/677,659, filed on Nov. 15, 2012, now Pat. No. 8,861,567.

(51) Int. Cl.
  *G01H 9/00* (2006.01)
  *G01V 1/18* (2006.01)
  (Continued)

(52) U.S. Cl.
  CPC .............. *G01V 1/18* (2013.01); *G01H 9/004* (2013.01); *G01S 7/521* (2013.01); *G01S 15/02* (2013.01)

(58) Field of Classification Search
  CPC ...................................... G01H 9/004
  See application file for complete search history.

(56) References Cited

U.S. PATENT DOCUMENTS 5,012,088 A * 4/1991 Cole ...................... G01H 9/004
                                                    250/227.19
5,723,856 A   3/1998 Yao
                (Continued)

OTHER PUBLICATIONS

Rubiola, E., et al. "Photonic-delay technique for phase-noise measurement of microwave oscillators," J. Opt. Soc. Am. B, 22(5), pp. 987-997 (2005).

(Continued)

*Primary Examiner* — Lisa Caputo
*Assistant Examiner* — Herbert K Roberts
(74) *Attorney, Agent, or Firm* — Lawrence E. Anderson (57) ABSTRACT

A method and system comprising:
  an optoelectronic oscillator comprising a light generator, a modulator, and at least one optical fiber, the optoelectronic oscillator operating to send a modulated carrier signal through the optical fiber into a target area and receive the return signal;
  a circuit for removal of the carrier frequency operatively connected to the oscillator comprising at least one phase shifter; at least one mixer operatively connected to the at least one phase shifter; at least control circuit operatively connected the at least one mixer and the at least one phase shifter for controlling the phase shifter and operating to cancel signals other than the sideband signals;
  a signal processor for processing the sideband signals to detect acoustical and/or vibrational signals from the target area. The method comprises sensing vibrational and/or acoustical signals for detection of acoustical and/or vibrational signals in the target area.

20 Claims, 6 Drawing Sheets

(51) Int. Cl.
    *G01S 7/521*    (2006.01)
    *G01S 15/02*    (2006.01)

(56) References Cited

U.S. PATENT DOCUMENTS

2001/0032514 A1\* 10/2001 Maruyama ............... G01H 9/00
                                                            73/657
2010/0290063 A1\* 11/2010 Bakhtiari ............. A61B 5/0507
                                                            356/614

OTHER PUBLICATIONS

Salzenstein, et. al., "Realization of Phase Noise Measurement Bench Using Cross Correlation and Double Optical Delay," Acta Physica Polanica A, Proceedings of the International School and Conference on Optics and Optical Materials, ISCOM07, Belgrade, Serbia, Sep. 3-7, 2007, p. 1107, vol. 112, No. 5 (2007).

\* cited by examiner

FIG. 1

Figure 2. Fiber spool for vibration and acoustic sensing.

FIG. 6. Spectral signature of a man walking obtained using embodiment shown in FIG. 3. Frequency measured is offset from the microwave frequency.

RF-PHOTONIC SYSTEM FOR ACOUSTIC AND/OR VIBRATIONAL SENSING USING OPTICAL FIBER AND METHOD THEREOF

CROSS REFERENCE TO RELATED APPLICATIONS

This application claims priority to and is a continuation-in-part of U.S. application Ser. No. 13/677,659 (ARL 08-40), entitled "Method and Apparatus for Analyzing the Spectrum of Radio-Frequency Signals Using a Fiber Optic Recirculation Loop," filed Nov. 15, 2012, by Ming-Chiang Li, and Weimin Zhou, herein incorporated by reference.

STATEMENT OF GOVERNMENT INTEREST

The embodiments herein may be manufactured, used, and/or licensed by or for the United States Government without the payment of royalties thereon.

BACKGROUND OF THE INVENTION

Optoelectronic systems include photonic radio frequency (RF) systems that incorporate photonic (optical) technology into traditional RF systems. Optical technology offers the advantage of remote capability and relative immunity to electromagnetic interference. Oscillator components for photonic radio frequency communication systems are known in the art, such as for example, U.S. Pat. No. 5,723,856 ('856 patent) entitled "Opto-electronic Oscillator Having a Positive Feedback with an Open Loop Gain Greater than one," hereby incorporated by reference. The '856 patent discloses an electro-optical oscillator for photonic radio frequency communication systems having positive feedback including an electro-optical modulator having an electrical input port for receiving a control signal and an optical output port. The electro-optical modulator generates an optical signal that oscillates at a frequency related to the electrical control signal. The oscillator also includes a photodetector that converts a portion of the optical signal from the optical output port to an electrical signal and provides the electrical signal to the electrical input port of the electro-optical modulator as the electrical control signal.

Existing photonic sensing systems include fiber-based acoustic sensor techniques that require deployment and installation of a long optical fiber close to the area of interest and may only sense the activity very close to the fiber and may not provide any spectrum information. A need exists for improved photonic radio frequency (RF) sensor systems that offer increased reliability and low noise for remote detection of acoustical signals.

SUMMARY OF THE INVENTION

The present invention is directed to a preferred embodiment system for sensing vibrational and/or acoustical signals from a target area comprising: an optoelectronic oscillator comprising:
  a light generator, a modulator, at least one optical fiber, and an RF coupler, the optoelectronic oscillator operating to send a modulated carrier signal having a carrier frequency through the optical fiber into a target area and receive the return signal comprising sideband signals;
a circuit for removal of the carrier frequency connected to the optoelectronic oscillator for receiving of the optical return signal from the target area and substantially removing the carrier frequency; the circuit for removal of signals other than sideband signals comprising:
  a phase shifter;
  a mixer operatively connected to the phase shifter;
  a control circuit operatively connected the mixer and the phase shifter for controlling the phase shifter and operating to cancel or remove the carrier frequency; and
a signal processor operatively connected to the circuit for removal of the carrier frequency, the signal processor operating to process the sideband signals to detect acoustical and/or vibrational signals from the target area.

Optionally, the preferred embodiment may further comprise a sensor operatively connected to the at least one optical fiber, the sensor being positionable in a target area to detect target signals in the form of, inter alia, acoustical waves and/or vibrations created from, for example, movement of vehicles, equipment and/or humans in the target area, digging in the target area, and/or seismic tremors. The return signal from the target area comprises a carrier frequency component and sideband signals of the carrier frequency perpetrated by the acoustical waves and/or vibrations. The circuit for removal of the carrier frequency operates to remove the carrier frequency component and transfer the remaining sideband signals to the signal processor, and wherein the signal processor processes the sideband signals to classify the sources of the target signals.

Optionally, the circuit for removal of the carrier frequency may comprise an interferometer that operates to remove the carrier frequency and transfer the remaining sidebands signals to the signal processor, and wherein the signal processor processes the sideband signals to identify the classification of the target signals. Thus, the return signal comprises a carrier frequency component and a target signal component in the form of sideband signals of the carrier frequency, and the interferometer operates to remove the carrier frequency such that substantially only the sideband signals remain.

Optionally, the light generator comprises a laser, and the modulator modulates the light beam at microwave frequencies. Optionally, the circuit for removal of the carrier frequency comprises a first input for receiving the return optical signal, a second input for receiving the modulated carrier signal, and wherein the mixer, the phase shifter and the control circuit comprise feedback circuitry, the feedback circuitry operating to provide a signal that is substantially 90° out of phase with the carrier signal so as to cancel the carrier signal, and output the remaining sideband signals to the signal processor, the remaining sideband signals being processed to detect the presence of vibrational and/or acoustical signals.

Optionally, the sensor may comprise, for example, a base, an elastic core operatively connected to the base, and a receiving surface movable by acoustical and/or vibrational waves operatively associated with the elastic core, the at least one optical fiber being wound on the elastic core, whereby acoustic and/or vibrations are transmitted by the surface to the at least one optical fiber causing stress and/or strain in the at least one optical fiber causing the round trip time to change, whereby the sideband signals are created by the vibrational and/or acoustical signals striking the receiving surface. The receiving surface of the sensor may be one of planar, conical or three-dimensional, and the portion of the optic fiber wound on the elastic core may have a length of at least five hundred meters.

The present invention further comprises a preferred method for sensing acoustic and/or vibrations from a target area comprising:

providing an oscillating circuit comprising:
a light generator, a modulator operatively connected to the light generator, an optical fiber operatively connected to the modulator, a sensor operatively connected to the optical fiber, and an RF coupler operatively connected to the optical fiber;
generating light utilizing the light generator;
modulating the light utilizing the modulator to create a carrier signal;
transmitting the carrier signal through the optical fiber to a sensor; the sensor operating to receive vibrational and/or acoustical signals to create sideband signals;
receiving the return carrier signal and sidebands through the optical fiber to by the RF coupler for transfer of an electronic signal to the modulator to complete the oscillating circuit;
providing a circuit for removal of the carrier frequency operatively connected to the oscillating circuit to substantially remove the carrier frequency comprising at least one phase shifter operatively connected to another of the at least one output; at least one mixer operatively connected to the at least one phase shifter, at least control circuit operatively connected the at least one mixer and the at least one phase shifter for controlling the phase shifter and operating to cancel signals other than the sideband signals; the at least one mixer operating to output the remaining sideband signals;
processing the sideband signals using a signal processor operatively connected the mixer to process the information contained in the sideband signals relating to the vibrational and/or acoustical signals.

Optionally, using the preferred method, the signal processor may operate to classify the nature of the information contained in the sidebands to identify the origin of the vibrational and/or acoustical signals.

Optionally, using the preferred method, the sensor comprises a spool of optical fiber having a receiving surface adjacent to the optical fiber, the vibrational and/or acoustical signals from the target area striking the receiving surface to create vibrations in spool of optical fiber thereby causing changes in the round-trip time of the optoelectronic oscillator and frequency variations in the carrier signal passing through the optical fiber.

Another preferred embodiment for sensing vibrational and/or acoustical signals from a target area comprises:
an optoelectronic oscillator comprising:
at least one light generator, at least one modulator operatively connected to the light generator, at least one optical fiber operatively connected to the light generator, a sensor operatively connected to the optical fiber, and at least one output, the at least one modulator operating to modulate the light from the at least one light generator to create a carrier signal for passage through the optical fiber to the sensor, the sensor operating to sense vibrational and/or acoustical signals which create sidebands in the carrier signal, the optical fiber operating to return the carrier signal with sidebands to the modulator and to at least one output;
a circuit for removal of signals other than sideband signals operatively connected to the oscillating circuit to substantially remove frequencies other the sidebands comprising;
at least one phase shifter operatively connected to another of the at least one output; at least one mixer operatively connected to the at least one phase shifter; at least control circuit operatively connected the at least one mixer and the at least one phase shifter for controlling the phase shifter and operating to cancel or remove signals other than the sideband signals;
the at least one mixer operating to output the remaining sideband signals;
a signal processor operatively connected to the at least one mixer for processing the sideband signals to detect vibrational and/or acoustic signals from the target area.

Optionally the another preferred embodiment may comprise at least one fiber optic delay operatively connected to the at least one output for delaying the carrier frequency and sideband signals and at least one RF converter operatively connected to the at least one fiber optic delay for converting the optical signal to an electrical signal. Furthermore, optionally the at least one output of the optoelectronic oscillator is an optical fiber input and another of the at least one output is an electrical output, and wherein the electrical output is operatively connected to the mixer.

Optionally, the at least one output of the optoelectronic oscillator is an electrical output that is operatively connected to the mixer and wherein the circuit for removal of signals other than sideband signals further comprises at least one laser and at least one laser modulator, the at least one laser generating light into the at least one laser modulator for input into the fiber optic delay.

Figure 4:
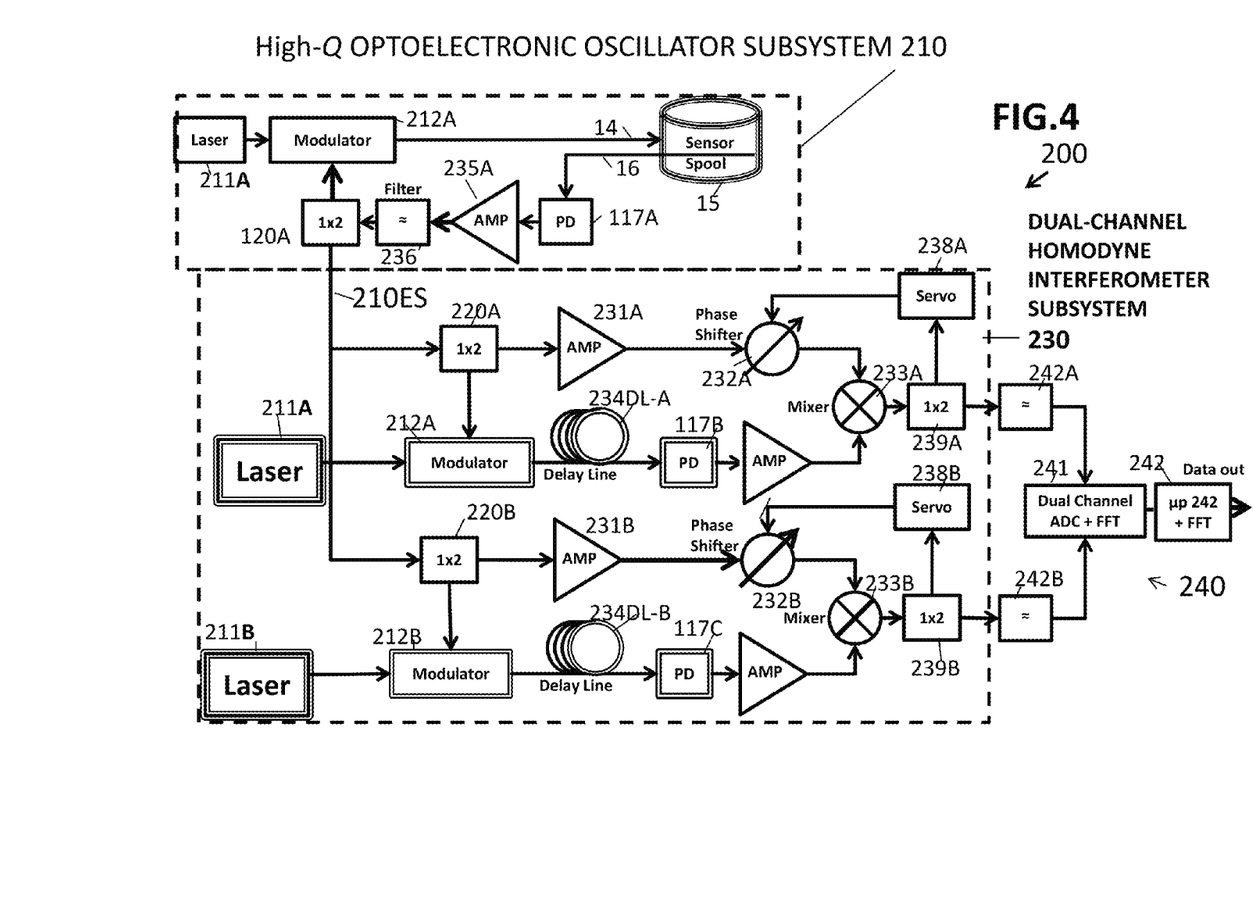
FIG. 4 is a schematic diagram of another alternative preferred embodiment sensor system with dual change carrier frequency removal.

As further options, forming another alternative embodiment depicted in FIG. 4, the circuit for removal of signals other than sideband signals comprises first and second lasers, first and second laser modulators, first and second fiber optic delays, first and second RF converters, each operatively connected to the first and second fiber optic delays, first and second phase shifters, each operatively connected to the at least one output of the optoelectronic oscillator; first and second mixers, each of the first and second mixers being operatively connected to first and second RF converters and first and second phase shifters, respectively; the first and second control circuits operatively connected the first and second mixers and the first and second phase shifters, respectively; the first and second control circuits each operating to cancel signals other than the sideband signals; the first and second mixers operating to each output the sideband signals. In the alternate embodiment of FIG. 4, the signal processor is operatively connected to the first and second mixers for processing the sideband signals to detect vibrational and/or acoustic signals from the target area.

Regarding the sensor for optional use in the embodiments of FIGS. 1, 3, 4 and 5, the sensor comprises a base, an elastic core operatively connected to the base, and a receiving surface movable by acoustical and/or vibrational waves operatively associated with the elastic core, the at least one optical fiber being wound on the elastic core, whereby acoustic and/or vibrations are transmitted by the surface to the at least one optical fiber causing stress and/or strain in the at least one optical fiber causing the round trip time to change, whereby sidebands to the carrier signal are created by the vibrational and/or acoustical signals striking the receiving surface In connection with the illustrated preferred embodiments, the signal returns having a carrier signal component with sidebands comprising a vibrational and/or acoustical signal component, the vibrational and/or acoustical signal component forming side bands, and wherein the circuit for removal of signals other than sideband signals operates to remove signals attributable to the carrier frequency such that only the vibrational and/or acoustical signals remain.

In connection with the illustrated preferred embodiments, the sensor is adapted to be positioned in a target area to detect target signals comprising acoustical waves and/or vibrations, the acoustical waves and/or vibrations being created from sources comprising movement of vehicles, equipment and/or humans in the target area, digging in the target area, and/or seismic tremors, and wherein the return signal comprises a carrier frequency component and a side band component perpetrated by the acoustical waves and/or vibrations, and wherein the circuit for removal of signals other than sideband signals operates to transfer the remaining sidebands to the signal processor, and wherein the signal processor processes the sidebands to classify the sources of the target signals.

As a further option, the at least one control circuit may comprise an electronic servo which controls the phase shifter causing the phase shifter to generate a signal which in effect cancels the signals substantially at the carrier frequency by generating a cancelling signal substantially ninety degrees out of phase such that the sideband signals remain, the at least one control circuit operatively connected the at least one mixer and the at least one phase shifter so as to form a feedback loop.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, subsystems and/or sections, these elements, components, subsystems and/or sections should not be limited by these terms. For example, when referring first and second photodetectors, these terms are only used to distinguish one photodetector, element, component, subsystem or section from another photodetector, element, component, subsystem or section. Thus, a photodetector, element, component, subsystem or section discussed below could be termed a second photodetector, element, component, subsystem or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Embodiments of the present invention are described herein with reference to cross-section illustrations that are schematic illustrations of idealized embodiments of the present invention. As such, variations from the shapes of the illustrations are to be expected. Thus, embodiments of the present invention should not be construed as limited to the particular shapes of regions illustrated herein but are to include deviations in shapes. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

A preferred method of practicing the present invention provides a method to sense acoustic and vibration signals and provides the signals as digitized time domain data that can then be converted to highly precise frequency spectra.

Figure 1:
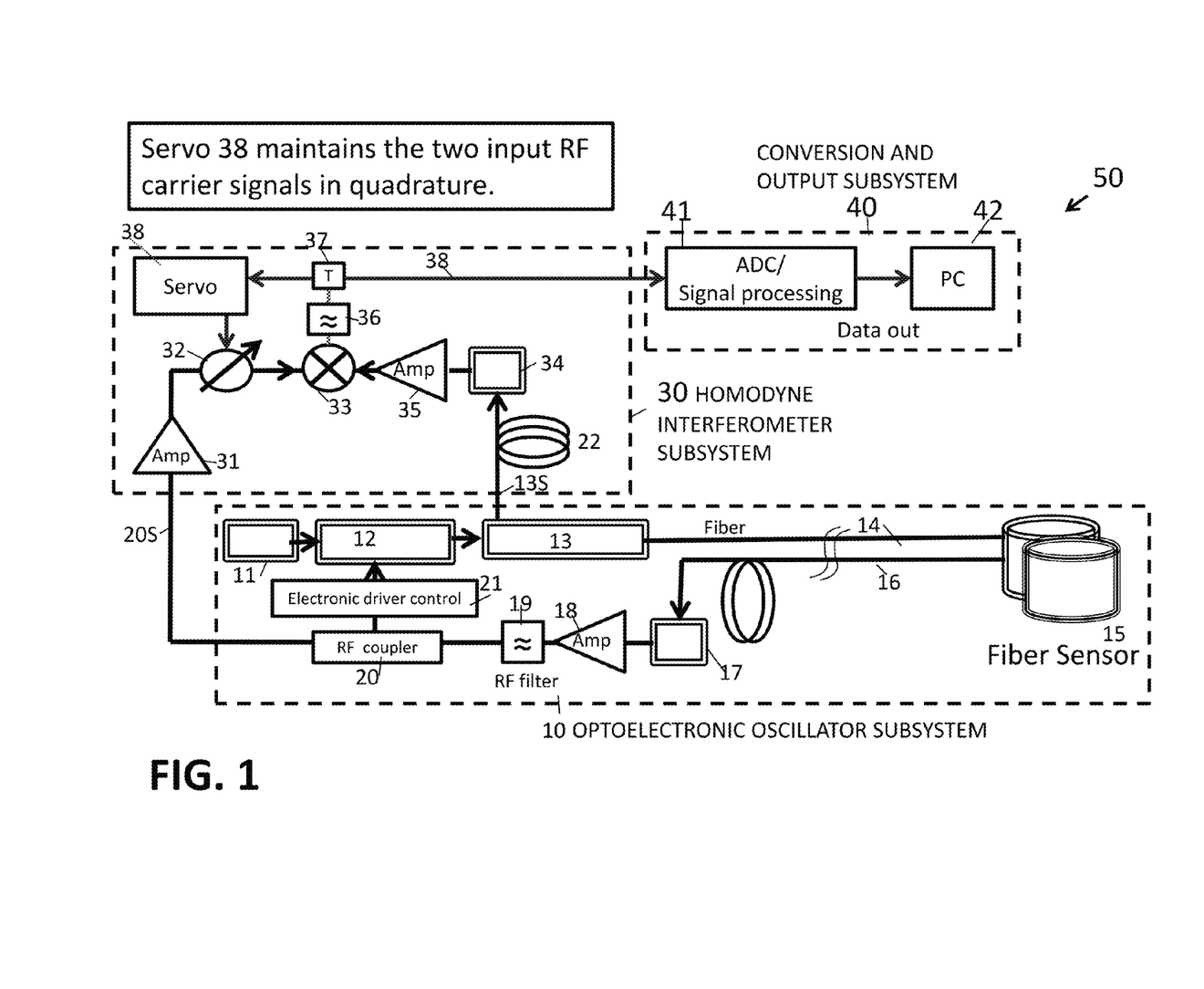
FIG. 1 is a schematic diagram of a preferred embodiment sensor system.

FIG. 1 shows a preferred embodiment acoustic/seismic sensor system 50 which consists of three basic subsystems. Optical domain components are shown using compound lines; electrical domain components using single lines. Three dashed boxes 10, 30 and 40 separate the three basic subsystems. The first subsystem 10 comprises a high-Q optoelectronic oscillator (OEO) with a long fiber . . . based ring resonator. This resonator is the sensor component that interacts with the acoustic, vibrational or seismic signals. Acoustic and/or vibrational signals occur as low-frequency modulation sidebands on the high-frequency RF signal of the OEO. The second subsystem 30 comprises a fiber-based ultra-sensitive homodyne interferometer, which is referred to herein as a circuit for removal of other than the sideband signals. The subsystem 30 down-converts the optoelectronic oscillator signal to baseband separating the acoustic/vibrational signal from the higher-frequency RF signal of the optoelectronic oscillator. The third subsystem 40 comprises a filter and analog-to-digital converter (ADC) 41 that process and convert the baseband signal to a format conducive for acoustic/vibrational sensing. The analog/digital converter can also be followed by a fast Fourier transform (FFT) analyzer to extract spectral information from the acoustic signals. An optional PC or computer 42 may be utilized to analyze the information.

Figure 2:
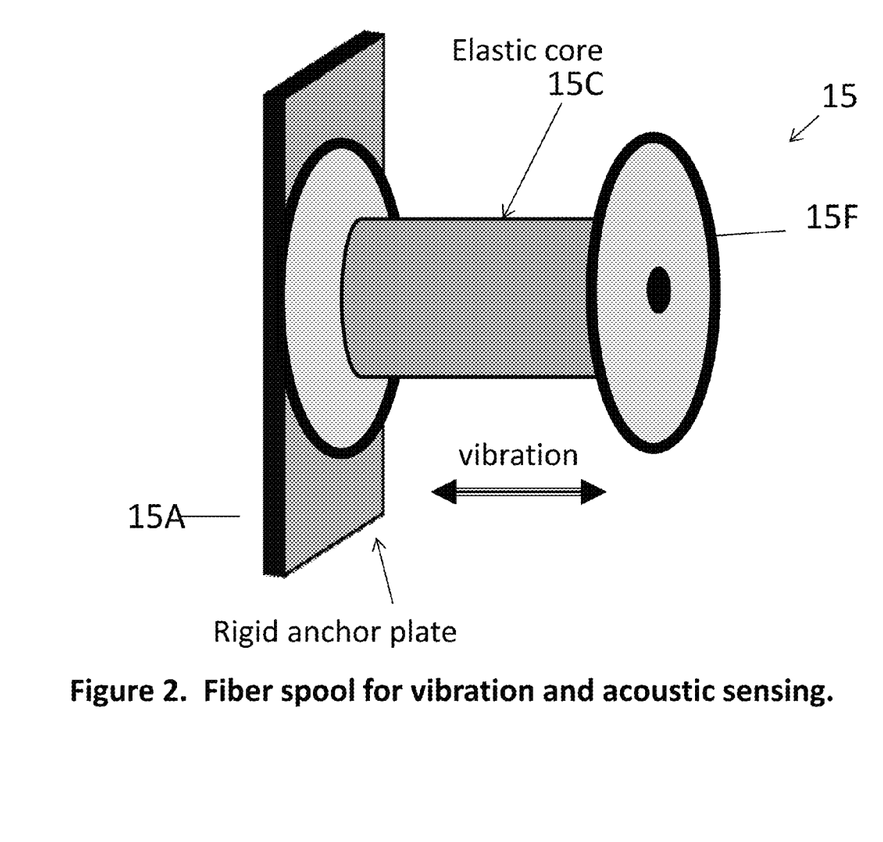
FIG. 2 is a schematic illustration of a fiber spool with an elastic core for sensing vibration and/or acoustics.

The optoelectronic oscillator subsystem 10 comprises of a laser 11 that is connected to an optical modulator 12. The modulator 12 modulates the laser beam at a predetermined frequency (such as for example, microwave frequencies) to generate a signal, hereinafter referred to as a carrier signal. The output of the modulator is connected to a fiber optical coupler 13 to split the carrier signal into two outputs. One output is connected to the sensing fiber 14 which may or may not include a fiber spool 15 to a remote sensing location, and return via fiber 16 to a photodetector 17. As such, the optical fiber of the optoelectronic oscillator subsystem 10 is divided into the sensing part and non-sensing part that operates to transport and delay the signal. The sensing part comprises the fiber sensor 15 which may take the form of a spool as illustrated in FIG. 2. Generally speaking, the spool may have 500 meters of optical fiber or fiber optic wound on it and may, for example, occupy a volume of less than six inches cubed. As shown in FIG. 2, the sensor may be in the form of a spool 15 upon which the optical fiber is tightly wound. The spool 15 may be placed in the target area, for example below ground, to detect acoustical signals from suspected digging or tunneling, or may be used to detect acoustical signals generated by the passage of a person or animal above and/or below ground level. Because of the nature of optical fibers, the round trip time of the optoelectronic oscillator is changed by stress and/or strain in the optical fiber, resulting in a change in frequency of the return signal. Acoustical signals striking the face 15F compress the optical fiber tightly wound on the resilient core 15C and result in a frequency and/or phase change in the photonic signal within the optical fiber on the spool 15. Aside from the sensing component of the optical fiber, the non-sensing component of the optical fiber may be used to generate delay, such as represented by the optical fiber loops 23. One of ordinary skill in the art would appreciate that the loops 23 are representative of a length of optical fiber forming a delay line which is not necessarily limited to a loop or loops but is shown that way as a matter of convenience. The optical fiber length thorough out the assembly 50 may be on the order of kilometers, such as 5-6 kilometers; a substantial portion of which operates to form the oscillator cavity and/or keep the noise level low.

The optoelectronic oscillator subsystem 10 further includes a photodetector 17 that converts the optical signal into an RF electronic signal that is amplified by an RF amplifier 18 having its output connected to a RF filter 19. The output signal of the RF filter 19 is split by an RF 1×2 coupler 20 with one output going to an electronic driver control circuit 21 which combines the RF signal with DC bias signal to modulate the optical modulator 12. The electronic driver control circuit 21 for the optical modulator 12 can provide an optional short square waveform that combines with the RF signal so the optoelectronic oscillator can operate in "pulsed" mode which may provide additional time or location information for sensing purposes.

Shown by dashed lines in the middle of FIG. 1 is the circuit for removing carrier frequency or signals other than the sideband signals. The subsystem 30 may comprise, for example, a homodyne interferometer (or carrier frequency cancelling) subsystem 30 that receives two inputs 20S, 13S from the optoelectronic oscillator subsystem 10. The RF input signal 20S from the RF coupler 20 is amplified by an RF amplifier 31 that is connected into a tunable RF phase shifter 32. The output of the phase shifter is connected to the first input of an RF mixer 33. In essence, the delay of the carrier signal is measured and countered by Servo 38 and phase delay 32 and such that passage through the mixer 33 essentially removes or cancels the carrier signal. As further shown in FIG. 1, the optical input signal from the fiber coupler 13S is connected to a fiber delay line 22 that inputted into a photodetector 34. Although the delay line 22 operates to delay both the carrier signal and the detected acoustical signal detected by the sensor 15, since the carrier signal is removed as will be described later, the objective is to delay the detected acoustical signal to facilitate its removal from the carrier signal. The delayed signal from photodetector 34 is sent to another RF amplifier 35 that feeds into the second input of the RF mixer 33. The output of the mixer 33 is coupled with a low-pass filter 36 and a T splitter 37 so part of the signal forms a feedback loop with a control circuit which controls the phase shifter, which may comprise, for example, an optional electronic servo 38. The optional electronic servo 38 in effect maintains the two input RF carrier signals in quadrature. Quadrature involves the usage of a 'quadrature' carrier frequency that is 90° out of phase with the main, or in-phase, carrier.

The control circuit for the phase shifter may comprise an optional feedback loop the essentially cancels and/or removes the carrier signal such that the second output 38 from the T splitter 37 provides the acoustic/vibrational sideband modulation signal to the third subsystem which includes an A/D convertor 41, the time domain data can be processed to obtain the signal of interest by signal processing processor 42 or by an FTT analyzer for a Fourier transformation to obtain the frequency spectrum. As recognized by those of ordinary skill in the art the processor 42 may be a personal computer, signal processor, computer, main frame, microprocessor, or the like and may include a display or printer output. The processor may operate to perform a (fast) Fourier transform in order to view the signals in the frequency domain.

There are additional optional features that can be added to the preferred embodiment assembly 50. The sensor 15 may consist of one or more fiber spools comprising a core 15C which may for example be shaped as a cylinder and made from elastic materials as shown in FIG. 2. A certain amount of fiber (such as 500 m) can be wound on the spool upon the core 15C. The spool 15 is anchored by the anchor plate 15A. The core 15C is elastic and the face, or receiving surface, 15F of the spool 15 is rigid such that an acoustic signal striking the face or receiving surface 15F will cause compression of the spool 15 and create stress and strain within the fiber optic or optical fiber cable wound on the spool. Using the example of 500 meters of fiber optic (or optical fiber) tightly wound on the spool 15, when an acoustic signal strikes the face 15F, the stress and/or strain produced in the coil or spool of fiber optic (or optical fiber) line by the acoustical signal generated by a target results in the change of the optical index and length of the optical fiber, which in turn causes a change in the frequency or phase of the carrier signal within the optical fiber, and enables frequency and/or phase detection. Due to the winding of the fiber optic on the spool 15, the effect is multiplied. For example, using 500 meters of coil on the spool 15 will produce a multiplication effect suitable for operation of the acoustical sensor systems of FIGS. 1, 3, 4 and 5. Generally, a length of five or six kilometers of optical fiber is sufficient for overall system operation in the embodiments of FIGS. 1, 3, 4 and 5 in order to provide a sufficient delay for the acoustical signal recognition.

The sensors 15 used throughout the embodiments herein may be directional so that once the location and alignment of the face 15F are predetermined, the direction of the acoustical signal and/or vibration from a suspected target may be determined. Moreover, if the acoustical signal and/or vibrational signal strengthens over time, this is indicative of a target moving towards the face 15F. If two sensors 15 are used, the location of the target may be determined through triangulation. If three sensors 15 are used, the faces 15F may be aligned in three different directions to create three axes for determination of the origin of the acoustical signal of the target. The sensors 15 are designed to be used with any of the preferred embodiments of FIGS. 1, 3, 4 and 5. Each of the sensors 15 have the capability of distinguishing the differences between an acoustical/vibrational signals, such as for example the acoustical/vibrational signals generated by an approaching horse from the acoustical/vibrational signals of a human being.

Figure 3:
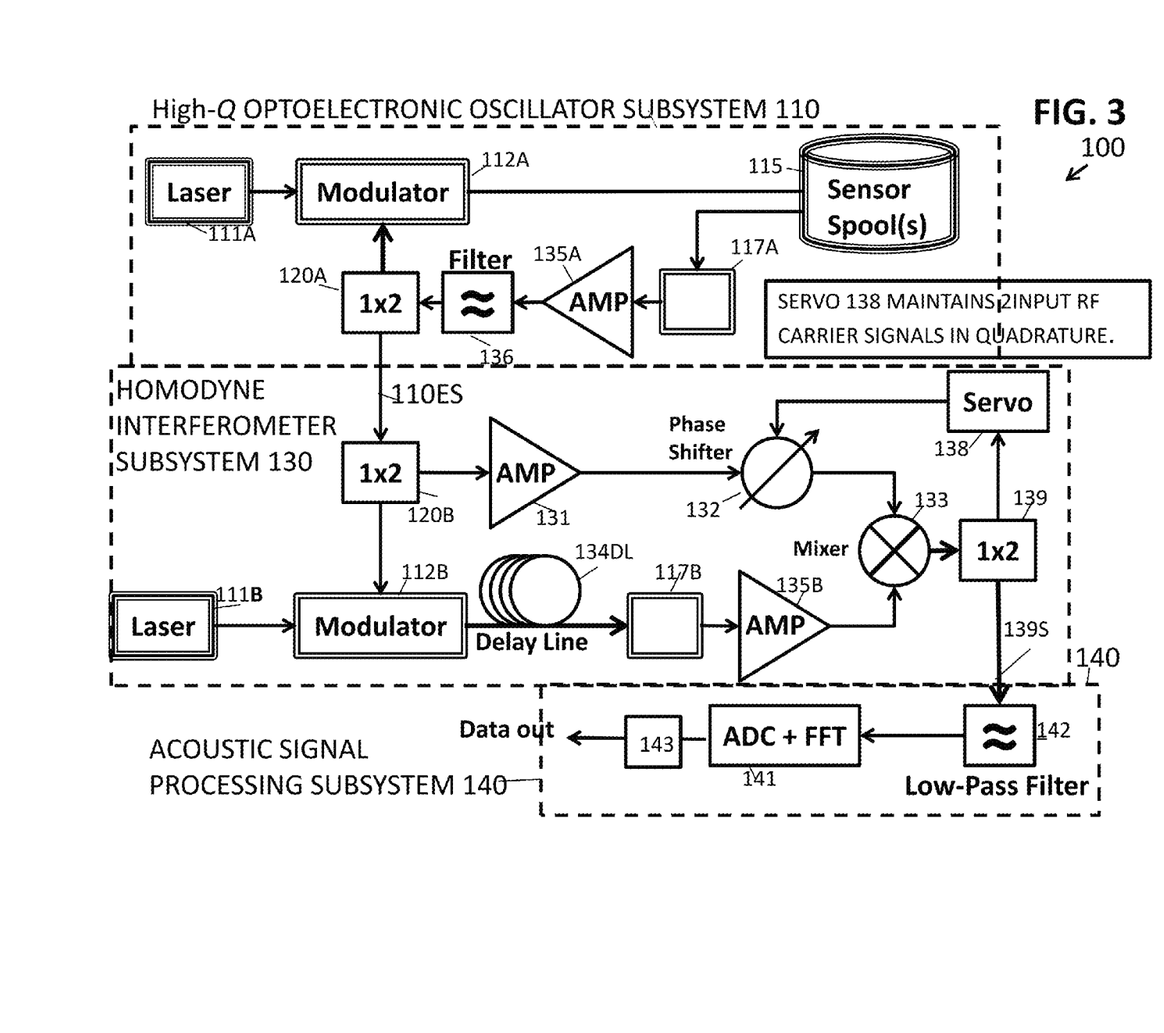
FIG. 3 is a schematic diagram of an alternative preferred embodiment sensor system including an additional laser (111B) and modulator (112B).

In addition to a preferred embodiment assembly 50, alternate configurations may be constructed that use additional laser/modulator pairs in the homodyne interferometer subsystem. For example, FIG. 3 shows a schematic diagram of another preferred embodiment acoustic sensor assembly 100. The dual channel homodyne interferometer suppresses systematic noise, thereby increasing acoustic sensitivity. FIG. 3 comprises a high-Q optoelectronic oscillator subsystem 110 comprising a laser 111A which emits light modulated by modulator 112A which passes through fiber optic cable to sensor 15, which may for example be the sensor of FIG. 2. The optoelectronic oscillator subsystems 10 of FIG. 1 and 110 of FIG. 3 function in the same manner and include the same components, such that the description of either applies to both. The exception is that optoelectronic subsystem 10 shows a RF coupler 20 and electronic drive circuit 21 whereas in optoelectronic subsystem 110, an RF 1×2 coupler/power splitter 120A is substituted.

An example of a suitable sensor spool applicable to both embodiments of FIGS. 1 and 3 is shown in FIG. 2. The output of the sensor 15 is detected by photodetector 117A which output is amplified by amplifier 135A. The output of the amplifier 135A passes through a filter 135 into a RF 1×2 coupler/power splitter 120A for input into the circuit 130 (for removing other than the sideband signals) via signal line 110ES.

As seen in FIG. 3, in the homodyne interferometer subsystem 130 of the alternate preferred embodiment includes an additional laser (111B) and modulator (112B). In the embodiment of FIG. 1, the laser signal utilized in conjunction with the homodyne interferometer system 30 is inputted via the fiber optical coupler 13 which operates to split the carrier signal into two outputs; one of which enters the circuit or subsystem 30 for removing other than the sideband signals (which may be for example a homodyne interferometer subsystem) via line 13L and the other is sent to the fiber sensor 15 via fiber optic (or optical fiber) line 14. It is noted that the optoelectronic oscillator subsystems 10 and 110 both in effect create a fiber optic oscillating circuit. A component in the regard to each of the subsystems 10, 110 is a fiber optic line of kilometer lengths to facilitate oscillation.

As shown in FIG. 3, unlike the embodiment of FIG. 1, the electrical-domain signal 110ES is tapped out from the optoelectronic oscillator subsystem 110 where it enters the RF 1×2 coupler/power splitter 120B. Part of the signal outputted from the RF 1×2 coupler/power splitter 120B is then used to drive the interferometer's modulator 112B. Modulator 112B modulates the light from laser 111B for passage through a delay line 134DL into photodetector 117B, which output is amplified by amplifier 135B for passage to a mixer 133. The configuration of FIG. 3, with the additional laser 111B and modulator 112B increases the optical power available to the interferometer. At least some of the optical domain components are drawn in using triple lines (see, e.g. laser 111B and sensor 115); electrical domain components in single lines; and electro-optic components in double lines (see, e.g. photodetector 117B). The other output from the RF 1×2 coupler/power splitter 120B passes through amplifier 131 to phase shifter 132. The phase shifter 132 in conjunction with the control circuit (for example, a servo) 138 in effect is used in conjunction with the phase of the carrier signal to effectuate cancellation of the carrier signal. The output from the phase shifter 132 is passed to a mixer 133, wherein the previously mentioned output from amplifier 135B is mixed therewith. The output of mixer 133 is outputted to the RF 1×2 coupler/power splitter 139. The signal is then split by the splitter 139 for output to the servo 138 and low pass filter 142, which is part of the acoustic signal processing subsystem 140. The control circuit 138 may for example, maintain two input RF carrier signals in quadrature. The term quadrature in general implies a 'quadrature' carrier frequency that is 90° out of phase with the main, or in-phase, carrier. The control circuit 138 operates to control the phase shifter 132 to enable cancellation of the central frequency via the mixer 133 to facilitate processing of the sideband signals.

One of ordinary skill in the art would appreciate that elements 32 33, 36, 37 and 38 may optionally form a feedback loop which is intended to effectuate the elimination of the carrier frequency. Usage of the fiber loop 134DL results in the acoustical/vibrational target signal being delayed and facilitates the preservation of the target signal. When the carrier frequency is eliminated via the optional feedback loop circuitry, the acoustical/vibrational target signal of the target remains for analysis by the conversion and output subsystem 140.

Note that when comparing the embodiment of FIG. 3 to the embodiment of FIG. 1, the optical tap from the optoelectronic oscillator to the interferometer shown in FIG. 1 as fiber line 13S has been removed. Instead, the signal is only tapped out in the electrical domain from the optoelectronic oscillator subsystem 110 via line 110ES. Instead, included with the a circuit for removal of signals other than sideband signals (which may be, for example, a homodyne interferometer subsystem) 130 is in a laser 111B, and modulator 112B, both of which are not present in the homodyne interferometer subsystem 30. In the embodiment of FIG. 3, the electrical domain signal from 110ES from the optoelectronic oscillator subsystem 110 is then sent to an RF 1×2 coupler/power splitter 120B. One output from the splitter 120B is sent to drive the interferometer's modulator 112B. The other output is sent to an amplifier 131 and ultimately to the phase shifter 132 and mixer 133 as shown in FIG. 3. The modulator 112B output is then sent to the delay-line 134DL as shown in FIG. 3. This configuration provides additional optical power to the homodyne interferometer. It may improve the sensitivity of the system in when limited by interferometer noise. However, the configuration of FIG. 3 increases the size, complexity, power-consumption, and cost of the system assembly 100 relative to preferred embodiment assembly 50 shown in FIG. 1.

Figure 6:
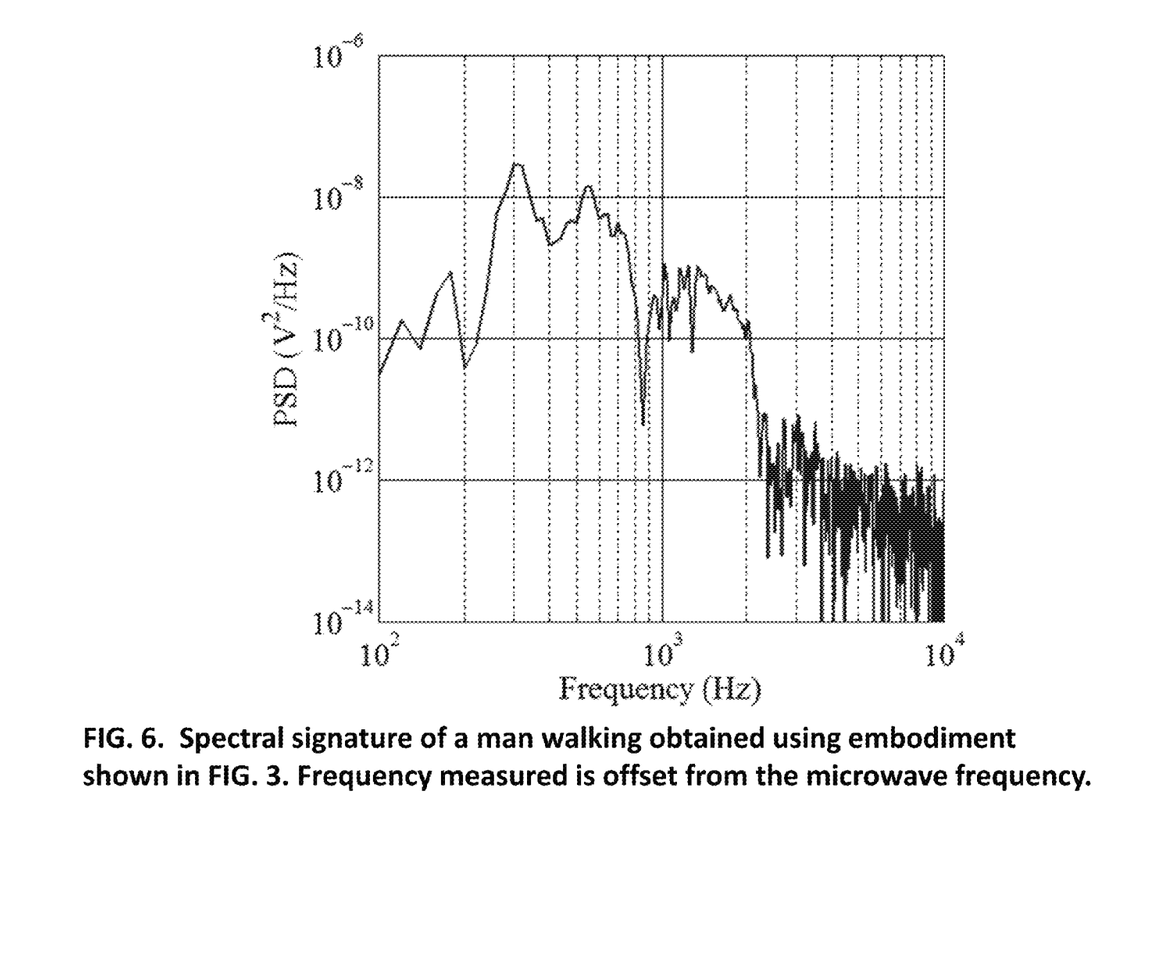
FIG. 6 illustrates the spectral signature of a man walking obtained using the embodiment shown schematically in FIG. 3.

Acoustic signal processing subsystem 140, shown in FIG. 3, further comprises an analog to digital converter and a fast Fourier transform (FFT) analyzer 141 to extract spectral information from the acoustic signals. An optional PC or computer 143 with or without a display and printer may be utilized to analyze the outputted information. FIG. 6 illustrates the spectral signature of a man walking obtained using the embodiment shown schematically in FIG. 3. The frequency signals shown are offset from the microwave carrier frequency.

FIG. 4 shows another preferred embodiment designed in accordance with the principles of the present invention. Beginning with the optoelectronic oscillator subsystem 210, the optoelectronic oscillator subsystem 210 is similar to the optoelectronic subsystems 10 and 110 of FIGS. 1 and 3 respectively and components having with the same last two numerical digits (e.g., 11, 11, 211A) may be utilized interchangeably. The optoelectronic oscillator subsystem 210 comprises of a laser 211A that is connected to an optical modulator 212A. The modulator 212A modulates the laser beam at a predetermined frequency (such as for example, microwave frequencies) to generate a signal, hereinafter referred to as a carrier signal. The output of the modulator 212A is connected to a fiber optical line to a sensor 15 which may be located at a remote sensing location, and return via fiber 16 to a photodetector 117A. As such, the optical fiber of the optoelectronic oscillator subsystem 210 is divided into the sensing part and non-sensing part that operates to transport and delay the signal. The sensing part comprises the sensor 15 which may take the form of a spool as illustrated in FIG. 2.

The photodetector 117A of the optoelectronic oscillator subsystem 210 converts the optical signal into an RF electronic signal that is amplified by an RF amplifier 235A having its output connected to a RF filter 236. The output signal of the RF filter 236 is split by an RF 1×2 coupler 120A with one output going to an electronic driver control circuit for modulator 212A which combines the RF signal with DC bias signal to modulate the optical modulator 212A. The electronic driver control circuit (not shown) for the optical modulator 212A can provide, for example, an optional short square waveform that combines with the RF signal so the optoelectronic oscillator can operate in "pulsed" mode which may provide additional time or location information for sensing purposes.

Shown by dashed lines in the middle of FIG. 4 is the circuit or subsystem 130 for removal of signals other than sideband signals (which may be, for example, a homodyne interferometer subsystem) that receives a single input 210ES from the optoelectronic oscillator subsystem 210. The RF input signal 210ES from the RF coupler 220A is amplified by an RF amplifier 231A that is connected into a tunable RF phase shifter 232A. The output of the phase shifter 232A is connected to the first input of an RF mixer 233A. In essence, the delay of the carrier signal is countered by servo 238A and phase delay 232A and such that passage through the mixer 233A essentially removes or cancels the carrier signal. As further shown in FIG. 4, the optical input signal from laser 211A passes through a modulator 212B to a long fiber delay line 234DL-A that inputted into a photodetector 117B. Although the delay line 234DL-A operates to delay both the carrier signal and the detected acoustical signal detected by the sensor 15, since the carrier signal is removed as will be described later, the objective is to delay the detected acoustical signal to facilitate removal from the carrier signal. The delayed signal from photodetector 117B is sent to an RF amplifier that feeds into the second input of the RF mixer 233A. The output of the mixer 233A may be coupled with a low-pass filter and a T splitter (as shown in FIG. 1). In the alternative, a feedback loop is formed with a control circuit 238A (which may be, for example, an electronic servo) via a RF signal splitter 239A. The control circuit 238A operates to remove the carrier or central frequencies. This may be accomplished, for example by output RF carrier signals in quadrature. Quadrature involves the usage of a 'quadrature' carrier frequency that is 90° out of phase with the main, or in-phase, carrier. The control circuit 238A comprises an electronic controller for the RF phase shifter. The RF phase shifter ensures that the signal in one arm is 90 degrees out of phase with the signal in the other arm. The electronic circuit 238A in effect operates as an electronic controller for the phase shifter 232A.

The optional feedback loop essentially cancels and/or removes the carrier signal such that the acoustic sideband modulation signal is outputted via the filter 242A to the third subsystem 240 which includes an A/D convertor so that the time domain data can be processed to obtain the signal of interest by signal processing processor 242 or by an FTT analyzer for a Fourier transformation to obtain the frequency spectrum.

As stated in conjunction with the embodiment of FIG. 1, the sensor 15 may consist of one or more fiber spools 15 comprising a core 15C which may for example be shaped as a cylinder and made from elastic materials as shown in FIG. 2.

In the preferred embodiment shown in FIG. 4, the circuit for removing other than the side band signals comprises two homodyne interferometers (or carrier signal removal circuits) used in parallel. The optional dual channel homodyne interferometer suppresses systematic noise, thereby increasing acoustic sensitivity. At least some of the optical domain components are drawn using triple-lined frames; electrical domain components in single lined frames; and electro-optic components in are represented using double-lined frames.

The signal from the optoelectronic oscillator subsystem is tapped out in the electrical domain as in FIG. 3, as represented by 210ES. However, the tapped signal is then split in two at an additional power splitters 220A and 220B and then sent to the modulators 212A, 212B and amplifiers in both dual interferometer (or carrier signal cancelling) channels. Specifically, with respect to the circuitry that begins with the laser 211B, optoelectronic oscillator subsystem 230 comprises laser 211B that is connected to an optical modulator 212B. The modulator 212B modulates the laser beam at a predetermined frequency (such as for example, microwave frequencies) to generate a signal, hereinafter referred to as a carrier signal. The output of the modulator 212B is connected to a fiber optic delay line 234DL-B and inputted into a photodetector 117C which in turn is connected into a mixer 233B. As such, there is a dual system of components lasers 211A, 211B, modulators 212A, 212B delay lines 234DL-A, 234DL-B, photodetectors 117B, 117C, which feed into mixers 233A, 233B. The signal line 210ES feed into RF splitters 231A, 231B which splits the signals to outputs to the modulators 212B, 212C and phase shifters 232A and 232B. Phase shifters 232A and 232B each form part of feedback loops. The mixers 233A, 233B are each connected to RF splitters 239A, 239B which connect to servos 238A, 238B which feedback into phase shifters 232A in the manner described above with respect to the servos 38, 138, phase shifter 32, 132 and mixers 33, 133 of the preferred embodiments of FIGS. 1 and 3, and the RF splitter 139 of FIG. 3. Inasmuch as there are two splitters 239A and 239B (which are identical in nature to the splitter 139 of FIG. 3), two separate acoustical/vibrational target signals remain after the carrier frequency is cancelled by the dual feedback circuitry of FIG. 4 (which operates in the manner described in reference to single feedback circuits of FIGS. 1 and 3). The two separate acoustical/vibrational target signals outputted from the RF splitters 239A, 239B may be fed into a filters 242A, 242B and using a dual channel analog to digital converter. The duality of the circuitry increases the reliability and sensitivity of the detection of the acoustical/vibrational target signals. The system shown schematically in FIG. 4 is similar to the embodiments schematically illustrated in FIGS. 1 and 3, with the exception that the output signals from both the mixers 233A, 233B in both interferometers being sent to a dual-channel signal processing subsystem 240. Subsystem 240 may further include a processor or microprocessor 242. This dual-channel subsystem can then utilize signal processing techniques such as cross-correlation to suppress system noise and increase the sensitivity of the acoustic sensor.

Figure 5:
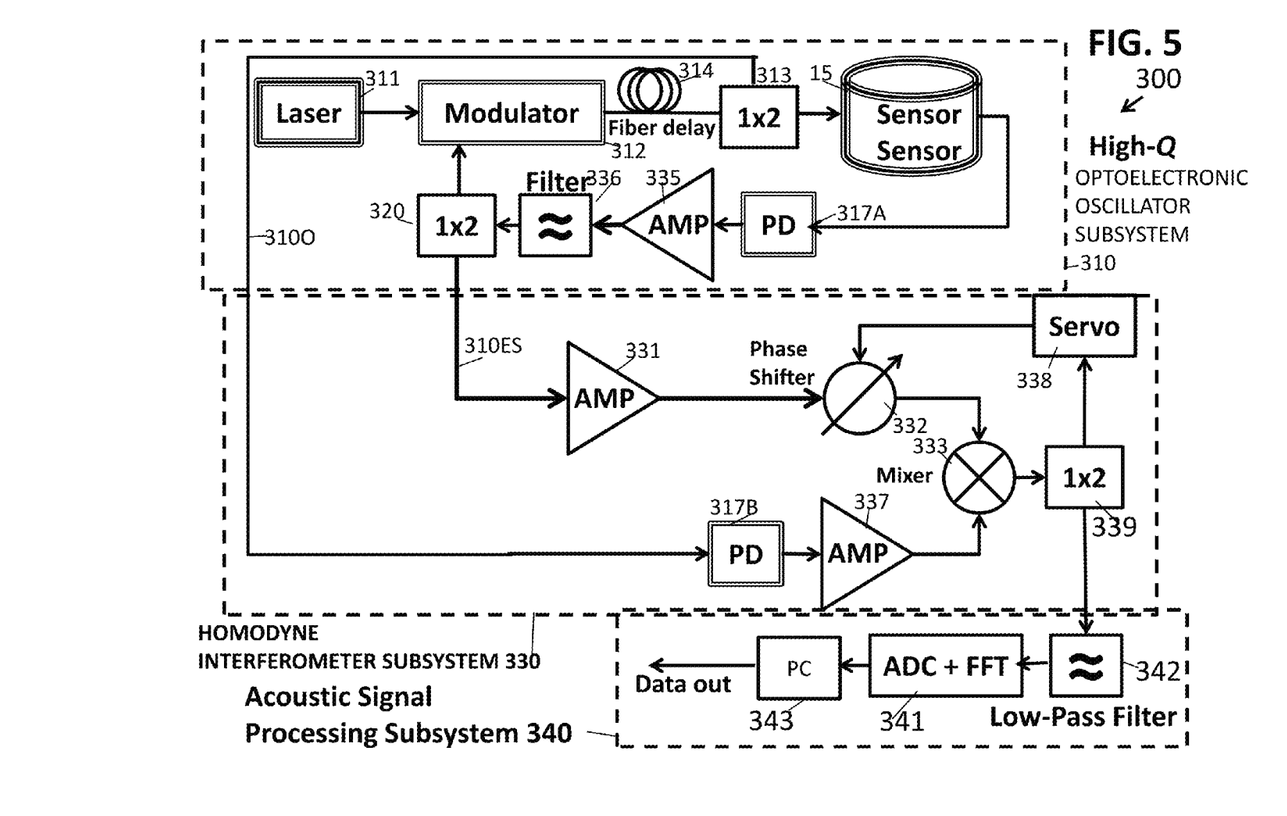
FIG. 5 is a schematic diagram of another alternative preferred embodiment sensor system.

FIG. 5 illustrates another preferred embodiment acoustic sensor system 300 utilizing the principles of the present invention. In FIG. 5, the optoelectronic oscillator subsystem 310 signal is tapped out electrically and optically from the midpoint of the sensor spool, as depicted by lines 310E (electric) and 310O (Optical). The signal is tapped from the mid-point of the OEO spool and then sent to the photodetector in the interferometer (or circuit for removal of other than the sideband signals or carrier frequency cancelling subsystem). In so doing, the separate delay-line can be eliminated in the circuit for removal of other than the sideband signals (which may be for example, an interferometer). At least some of the optical domain components are framed using triple lines; electrical domain components are represented using single frames; and electro-optic components are represented using double-lined frames.

The alternate preferred embodiment of FIG. 5 is similar to the preferred embodiment configuration shown in FIG. 1. Three dashed boxes 310, 330 and 340 separate the three basic subsystems. The first subsystem 310 comprises a high-Q optoelectronic oscillator (OEO) with a long fiber-based ring resonator. This resonator is the sensor component that interacts with the acoustic or seismic signals. Acoustic/vibrational signals occur as low-frequency modulation sidebands on the high-frequency RF signal of the optoelectronic oscillator subsystem. The second subsystem 330 comprises circuitry for removal of other than the sideband signals which may comprise a fiber-based ultra-sensitive homodyne interferometer. The interferometer down-converts the optoelectronic oscillator signal to baseband separating the acoustic/vibrational signal from the higher-frequency RF signal of the OEO. The third subsystem 340 comprises a filter and analog-to-digital converter (ADC) 341 that process and convert the baseband signal to a format conducive for acoustic/vibrational sensing. The ADC can also be followed by a fast Fourier transform (FFT) analyzer to extract spectral information from the acoustic signals. An optional PC or computer 342 may be utilized to analyze the information.

The optoelectronic oscillator subsystem 310 comprises a laser 311 that is connected to an optical modulator 312. The modulator 312 modulates the laser beam at a predetermined frequency (such as for example, microwave frequencies) to generate a signal, hereinafter referred to as a carrier signal. The output of the modulator 312 is connected to a fiber optical line forming a fiber delay line 314 to an RF splitter 313: one output of which is connected to a fiber sensor 15 to a remote sensing location. The return signal from the sensor 15 returns via fiber optic to a photodetector 317A. The sensor 15 may take the form of a spool as illustrated in FIG. 2. The optoelectronic oscillator subsystem 310 further includes a photodetector 317A that converts the optical signal into an RF electronic signal that is amplified by an RF amplifier 335 having its output connected to a RF filter 336. The output signal of the RF filter 336 is split by an RF 1×2 coupler 320 with one output going to an electronic driver control circuit which combines the RF signal with DC bias signal to modulate the optical modulator 312. The electronic driver control circuit (shown in conjunction with the embodiment of FIG. 1, but which may be duplicated for the embodiment of FIG. 5) for the optical modulator 312 can provide an optional short square waveform that combines with the RF signal so the optoelectronic oscillator can operate in "pulsed" mode which may provide additional time or location information for sensing purposes.

Returning once again to the splitter 313, the second output is connected via fiber optic line to the circuit for removal of other than the sidebands (or homodyne interferometer) subsystem 330 and more specifically to a photodetector 317B. The output of the photodetector 317B, subsequent to optional amplifier 337, forms one input of a mixer 333.

Referring back to RF splitter 320 in the optoelectronic oscillator, RF splitter 320 outputs an electrical signal via line 310ES though an optional amplifier 331 to phase shifter 332. Similar to the embodiments of FIGS. 1, 3, and 4, a feedback loop is formed via phase shifter and servo 338, which may be identical in function to servos 38, 238 A,B, and 138. The output of the mixer 333 is passes through an RF splitter 339 so that the signal forms a feedback loop with an electronic control circuit (for example a servo) 338 which, may for example, maintains the two input RF carrier signals in quadrature.

The optional feedback loop essentially cancels and/or removes the carrier frequency such that the second output 339 from the splitter 339 provides the acoustic/vibrational sideband modulation signal to the third subsystem 340 which includes an A/D convertor 341, the time domain data can be processed to obtain the signal of interest by signal processing processor 342 or by an Fast Fourier Transform (FFT) analyzer for a Fourier transformation to obtain the frequency spectrum.

Note that in the embodiment shown in FIG. 5, the delay-line in the circuit for removal of other than the sideband signals has been removed. In so doing, the Optoelectronic oscillator's sensor spool 15 is also used as the delay-line in the interferometer. This design reduces system cost and complexity but decreases sensitivity relative to the base configuration.

FIG. 6 illustrates an example of a spectral signature of a man walking obtained using embodiment shown in FIG. 3. Frequency measured is offset from the microwave frequency. Note that the spectral signature may be used to identify and/or distinguish a man from a horse. The sensors 15 may be triangulated so as to more precisely locate the target producing the spectral signature. Three sensors may be used to sense in directions correlating to x, y, z coordinates to provide additional locational data.

As to the advantages of the present invention, current state-of-the-art acoustic sensors come in two categories: mechanical, and fiber-optic sensors. The potential advantages of fiber-optic sensors over mechanical sensors are as follows:
1. Potentially increased sensitivity due to the short optical wavelengths and low loss-per-unit-length of optical fibers
2. Increased sensing bandwidth because of the high laser frequency and broad bandwidth of optical fiber
3. Ruggedness of optical fiber relative to delicate MEMs sensors allows them to be deployed in a wider range of environments including underwater and underground.

In general, most fiber optic sensors send a laser signal through lengths of optical fiber or fiber Bragg gratings. The fibers or fiber gratings are exposed to the acoustic signal which modulates the laser signal. The result laser modulation is then detected using an interferometer or a power detector. The acoustic/vibrational sensor of the preferred embodiments described in the foregoing differ from the current state-of-the-art in fiber-optic sensors in that the embodiments of FIGS. 1, 3, 4, and 5 utilize an ultra-pure radio-frequency (RF) signal (typically on the order of 10 GHz). It is this ultra-pure RF signal that is modulated by the acoustic/vibrational signal from the target area (where the fiber sensor 15 is placed). The advantages of the preferred embodiment optoelectronic oscillator based sensor of the current state-of-the-art include the following: (1) The RF signal has a much narrower linewidth than even the best laser signals meaning that the acoustic signal experiences less spectral distortion. This allows the optoelectronic oscillator based sensor to more accurately record the spectral profile of the acoustic signal. (2) The RF-signal in the optoelectronic oscillator is impervious to first-order optical phase perturbations in the fiber allowing it to measure the acoustic signal more accurately in the presence of thermally-induced optical phase fluctuations.

By employing Rayleigh and Brillouin suppression in the optoelectronic oscillator, nonlinear optical scattering effects that would broaden and distort the acoustic signal are suppressed. Moreover, the optoelectronic oscillator-based sensors of the preferred embodiments are impervious to laser frequency noise allowing employment of relatively inexpensive semiconductor diode lasers. Because the fiber spool can be longer than the laser coherence length, the optoelectronic oscillator-based sensor of the present invention as utilized in the preferred embodiments of FIGS. 1, 3, 4 and 5 can utilize much longer fiber spools than standard interferometric fiber-optic sensors.

The deployment/installation of the sensor in is invention can be covert, because it can be buried in a remote area away from the immediate area of interest such as a busy street. Since it can also provide a high resolution/high quality spectrum of the detected signal, one can identify the source of activity such as human walking, animal crossing, cars, digging, etc.

Other possible uses for the invention include subterranean seismic sensors, underwater acoustic sensors, ultra-sensitive microphones, and sonar applications. Conceptually, the present invention combines a fiber based optoelectronic high Q RF oscillator loop with an ultra-sensitive fiber delay-line signal discriminator for acoustic and seismic sensing. The present invention further comprises the making of a vibration sensitive fiber spool.

The present invention provides, inter alia, a basic method and apparatus of acoustic seismic sensing and signal spectrum analysis using an optoelectronic system that contain an fiber-spool based RF oscillator and fiber delay-line based signal discriminator/correlator.

As used herein the terminology optoelectronic oscillator includes an optoelectronic oscillator circuit which forms a loop for signal oscillation.

As used herein the terminology "PC," "computer" or "processor" means signal processing circuitry, microprocessor, multiprocessor, controller, mainframe, or a plurality of computers, processors, microprocessors, multiprocessors, controller, or mainframes or equivalents thereof.

As used herein the terminology "target area" means the region of interest in which the sensor may be placed.

As used herein the terminology "servo" or "servomechanism" refers to an electronic controller or an automatic device that controls the phase shifter or a similar device. The servo may utilize feedback.

As used herein the terminology "target signature" means the characteristic pattern of a target displayed by detection and identification equipment.

As used herein the terminology optical fiber includes a thin glass strand designed for light transmission. An optical fiber may be constructed of a transparent core made of nearly pure silicon dioxide ($SiO_2$), through which the light travels. The core may be surrounded by a cladding layer that reflects light, guiding the light along the core.

As used herein the terminology "sideband signals" and "sideband signal" are used interchangeably and may be substituted without departing from the scope of the invention.

As used herein, the terminology "round trip time" refers to the time it takes the light to complete a round trip within the optoelectronic oscillator. For example, the term "round trip time" refers to the time it takes for the signal to travel once around the oscillator path (i.e. from output of modulator 12 to output of the electronic driver control 21 in FIG. 1). This time sets the oscillator frequency and is affected by both length fluctuations and index of refraction fluctuations.

As used herein, the terminology "interferometer" refers to homodyne detection wherein the interference occurs between two beams at the same carrier frequency resulting in cancellation of the carrier frequency, and whereupon the remaining signal is measured, viewed or recorded. The term is used interchangeably with carrier frequency removal circuit or circuitry.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system for sensing vibrational and/or acoustical signals from a target area comprising:
   an optoelectronic oscillator comprising a light generator, a modulator, and at least one optical fiber, the optoelectronic oscillator operating to send a modulated carrier signal having a carrier frequency through the optical fiber into a target area and receive a return signal comprising a carrier frequency component and sideband signals that resonate within the optoelectronic oscillator;
   a circuit for removal of signals other than sideband signals operatively connected to the optoelectronic oscillator for receiving of the optical return signal from the target area and substantially removing the carrier frequency; the circuit for removal of the carrier frequency comprising;
   a phase shifter;
   a mixer operatively connected to the phase shifter;
   a control circuit operatively connected to the mixer and the phase shifter for controlling the phase shifter and operating to remove the carrier frequency;
   a signal processor operatively connected to the circuit for removal of the carrier frequency, the signal processor operating to process the sideband signals to detect acoustical and/or vibrational signals from the target area.

2. The system of claim 1 wherein the circuit for removal of signals other than sideband signals comprises an interferometer circuit and wherein the carrier frequency signal is an RF carrier frequency range signal that is removed by interferometry; and further comprising a sensor operatively connected to the at least one optical fiber, the at least one optical fiber being positioned in the target area to detect target signals comprising acoustical waves and/or vibrations, the acoustical waves and/or vibrations being created from sources comprising movement of vehicles, equipment and/or humans in the target area, digging in the target area, and/or seismic tremors, and wherein the return signal comprises a carrier frequency component and sideband signals of the carrier frequency that resonates within the optoelectronic oscillator, and wherein the a circuit for removal of the carrier frequency operates to remove the carrier frequency component and transfer the remaining sideband signals to the signal processor, and wherein the signal processor processes the sideband signals to classify the sources of the target signals.

3. The system of claim 1 further comprising a sensor operatively connected to the at least one optical fiber, the sensor being positioned in the target area to detect vibrational and/or acoustical signals and wherein the return signal comprises a carrier frequency component and a vibrational and/or acoustical signal component in the form of the sideband signals of the carrier frequency that resonate within the optoelectronic oscillator, and wherein the circuit for removal of the carrier frequency comprises an interferometer that operates to remove the carrier frequency and transfer the remaining sidebands signals to the signal processor.

4. The system of claim 3 wherein the return signal comprises a carrier frequency component and a target signal component in the form of sideband signals of the carrier frequency, and wherein the interferometer operates to remove the carrier frequency such that substantially only the sideband signals remain; and wherein the mixer comprises a first input operatively connected to the phase shifter and a second input operatively connected to the at least one optical fiber through a delay line; the delay line operating to delay the sideband signals to facilitate recognition thereof.

5. The system of claim 1 further comprising a delay line operatively connected to the at least one optical fiber; wherein the circuit for removal of signals other than sideband signals is a homodyne interferometer circuit and wherein the carrier frequency signal is removed by interferometry; and wherein the mixer comprises a first input operatively connected to the phase shifter and a second input operatively connected to the at least one optical fiber through the delay line.

6. The system of claim 1 wherein the light generator comprises a laser, and wherein the modulator modulates the light beam at microwave frequencies, and wherein the circuit for removal of the carrier frequency comprises a first input for receiving the return optical signal, a second input for receiving the modulated carrier signal, and wherein the mixer, the phase shifter and the control circuit comprise feedback circuitry, the feedback circuitry operating to provide a signal that is substantially 90° out of phase with the carrier signal so as to cancel the carrier signal, and output the remaining sideband signals to the signal processor, the remaining sideband signals being processed to detect the presence of vibrational and/or acoustical signals; and wherein the mixer comprises two inputs comprising a first input operatively connected to the phase shifter and a second input operatively connected to the at least one optical fiber through a delay line.

7. The system of claim 1 further comprising a sensor operatively connected to the at least one optical fiber, the sensor comprising a base, an elastic core operatively connected to the base, and a receiving surface movable by acoustical and/or vibrational waves operatively associated with the elastic core, the at least one optical fiber being wound on the elastic core, whereby acoustic and/or vibrations are transmitted by the surface to the at least one optical fiber causing stress and/or strain in the at least one optical fiber causing the round trip time to change, whereby the sideband signals are created by the vibrational and/or acoustical signals striking the receiving surface.

8. The system of claim 7 wherein the receiving surface is one of planar, conical or three-dimensional, and wherein the portion of the at least optical fiber wound on the elastic core comprises a length of at least five hundred meters.

9. A method for sensing acoustic and/or vibrations from a target area comprising:
   providing an oscillating circuit comprising:
      a light generator, a modulator operatively connected to the light generator,
      an optical fiber operatively connected to the modulator,
      a delay line operatively connected to the optical fiber;
      a sensor operatively connected to the optical fiber, and
      an RF coupler operatively connected to the optical fiber;
   generating light utilizing the light generator;
   modulating the light utilizing the modulator to create a radio frequency carrier signal;
   transmitting the carrier signal through the optical fiber to the sensor;
   the sensor operating to receive vibrational and/or acoustical signals to create sideband signals;
   receiving the return carrier signal and sidebands through the optical fiber by the RF coupler for transfer of an electronic signal to the modulator to complete the oscillating circuit;
   providing a circuit for removal of the carrier frequency operatively connected to the oscillating circuit to substantially remove the carrier frequency comprising
      at least one phase shifter operatively connected to an output of the sensor;
      at least one mixer having at least two inputs; first input operatively connected to the at least one phase shifter and a second input operatively connected to the sensor through a delay line such that the signal received at the second input is a delayed output signal of the sensor;
      at least control circuit operatively connected the at least one mixer and the at least one phase shifter for controlling the phase shifter and operating to cancel signals other than the sideband signals;
   processing the sideband signals using a signal processor operatively connected the mixer to process the information contained in the sideband signals relating to the vibrational and/or acoustical signals.

10. The method of claim 9 wherein the sensor has at least one output and wherein the circuit for removal of the carrier frequency further comprises a splitter operatively connected to at least one output of the sensor, an optical intensity modulator operatively connected to the splitter, a second laser operatively connected to the optical intensity modulator, a photodetector, and amplifier; the beam from the second laser being monitored by the optical intensity modulator and sent through the delay line to the photodetector; the output of the photodetector being operatively connected to the amplifier; the output of the amplifier being operatively connected to the second input of the mixer; and wherein the signal processor operates to classify the nature of the information contained in the sidebands to identify the origin of the vibrational and/or acoustical signals.

11. The method of claim 10 wherein the sensor comprises a spool of optical fiber having a receiving surface adjacent to the optical fiber, the vibrational and/or acoustical signals from the target area striking the receiving surface to create vibrations in spool of optical fiber thereby causing changes in the round-trip time of the optoelectronic oscillator and frequency variations in the carrier signal passing through the optical fiber.

12. A system for sensing vibrational and/or acoustical signals from a target area comprising:
   an optoelectronic oscillator comprising:
      at least one light generator, at least one modulator operatively connected to the light generator, at least one optical fiber operatively connected to the light generator, a sensor operatively connected to the optical fiber, and at least one output, the at least one modulator operating to modulate the light from the at least one light generator to create a radio frequency carrier signal for passage through the optical fiber to the sensor, the sensor operating to sense vibrational and/or acoustical signals which create sidebands in the carrier signal, the optical fiber operating to return the carrier signal with sidebands to the modulator and to at least one output;
   a circuit for removal of signals other than sideband signals operatively connected to the oscillating circuit to substantially remove frequencies other the sidebands comprising;
      at least one phase shifter operatively connected to another of the at least one output;
      at least one mixer operatively connected to the at least one phase shifter;
      at least control circuit operatively connected the at least one mixer and the at least one phase shifter for controlling the phase shifter and operating to cancel or remove signals other than the sideband signals;
      the at least one mixer operating to output the remaining sideband signals;
   a signal processor operatively connected to the at least one mixer for processing the sideband signals to detect vibrational and/or acoustic signals from the target area.

13. The system of claim 12 wherein the at least one modulator is configured to modulate the intensity of the light from the at least one light source to form an RF frequency carrier wave and further comprising at least one fiber optic delay operatively connected to the second input of the mixer for delaying the carrier frequency and sideband signals and at least one RF converter operatively connected to the at least one fiber optic delay for converting the optical signal to a delayed electrical signal based upon the carrier signal for input into the mixer; wherein the circuit for removal of signals other than sideband signal is an interferometric circuit that removes the carrier frequency by interferometry due to the phase difference between the inputs to the mixer.

14. The system of claim 12 wherein the second input to the mixer is operatively connected to an optical fiber delay and wherein the light beam modulated for input to the sensor passes through the optical fiber delay before input to the mixer such that the signal received at the second input of the mixer is delayed relative to the signal passing through the sensor to facilitate recognition of the sideband signals attributable to the vibrational and/or acoustical signals from the target area.

15. The system of claim 12 wherein the circuit for removal of signals other than sideband signals further comprises at least one laser and at least one laser modulator, the at least one laser generating light into the at least one laser modulator for input into a fiber optic delay.

16. The system of claim 12 wherein the circuit for removal of signals other than sideband signals comprises first and second lasers, first and second laser modulators, first and second fiber optic delays, first and second RF converters, each operatively connected to the first and second fiber optic delays, first and second phase shifters, each operatively connected to the at least one output of the optoelectronic oscillator; first and second mixers, each of the first and second mixers being operatively connected to the first and second RF converters and first and second phase shifters, respectively;

first and second control circuits operatively connected to the first and second mixers and the first and second phase shifters, respectively; the first and second control circuits each operating to cancel signals other than the sideband signals; the first and second mixers operating to each output the sideband signals; and wherein the signal processor is operatively connected to the first and second mixers for processing the sideband signals to detect vibrational and/or acoustic signals from the target area.

17. The system of claim 12 wherein the sensor comprises a base, an elastic core operatively connected to the base, and a receiving surface movable by acoustical and/or vibrational waves operatively associated with the elastic core, the at least one optical fiber being wound on the elastic core, whereby acoustic and/or vibrations are transmitted by the surface to the at least one optical fiber causing stress and/or strain in the at least one optical fiber causing the round trip time to change, whereby sidebands to the carrier signal are created by the vibrational and/or acoustical signals striking the receiving surface.

18. The system of claim 12 wherein the optical fiber operates to return the carrier signal substantially at the carrier frequency with sidebands comprising a vibrational and/or acoustical signal component, the vibrational and/or acoustical signal component forming side bands, and wherein the circuit for removal of signals other than sideband signals operates to remove signals attributable to the carrier frequency such that only signals attributable to the vibrational and/or acoustical signals remain.

19. The system of claim 12 wherein the sensor is adapted to be positioned in a target area to detect target signals comprising acoustical waves and/or vibrations, the acoustical waves and/or vibrations being created from sources comprising movement of vehicles, equipment and/or humans in the target area, digging in the target area, and/or seismic tremors, and wherein the return signal comprises a carrier frequency component and a side band component perpetrated by the acoustical waves and/or vibrations, and wherein the circuit for removal of signals other than sideband signals operates to transfer the remaining sidebands to the signal processor, and wherein the signal processor processes the sidebands to classify the sources of the target signals.

20. The system of claim 12 wherein the at least one control circuit comprises an electronic servo which controls the phase shifter causing the phase shifter to generate a signal which in effect cancels the signals substantially at the carrier frequency by generating a cancelling signal substantially ninety degrees out of phase such that the sideband signals remain, the at least one control circuit operatively connected the at least one mixer and the at least one phase shifter so as to form a feedback loop.

* * * * *